United States Patent [19]

Mathisen et al.

[11] 4,158,505
[45] Jun. 19, 1979

[54] SPECTRUM ANALYZING SYSTEM WITH PHOTODIODE ARRAY

[75] Inventors: Einar S. Mathisen, Poughkeepsie; Paul A. Schumann, Jr., Wappinger Falls; Alvin H. Tong, Poughkeepsie, all of N.Y.

[73] Assignee: International Business Machines Corporation, Armonk, N.Y.

[21] Appl. No.: 754,810

[22] Filed: Dec. 27, 1976

[51] Int. Cl.² .............................. G01J 3/06; G01J 3/42
[52] U.S. Cl. .................................... 356/308; 356/323; 356/325
[58] Field of Search ............... 356/308, 309, 319, 323, 356/324, 325, 326, 329, 83, 93, 95

[56] References Cited

U.S. PATENT DOCUMENTS

| 3,640,627 | 2/1972 | Beattie et al. | 356/104 |
| 3,874,799 | 4/1975 | Isaacs et al. | 356/97 |
| 3,973,849 | 8/1976 | Jackson et al. | 356/97 |

Primary Examiner—Vincent P. McGraw
Attorney, Agent, or Firm—Douglas R. McKechnie

[57] ABSTRACT

A spectrum analyzing system measures or analyzes the colorimetric properties of a test sample at a preselected wavelength or range of wavelengths within the ultraviolet, visible, and near infrared regions. The system includes a spectrophotometer provided with a wideband light source, optical devices providing a sample light path and a reference light path, a chopper wheel allowing light to be directed alternately along the sample and reference paths interspersed with dark periods during which no light travels along either path, a dispersion grating for dispersing the light from both paths, a series of neutral density filters for limiting to various degrees the amount of light traversing each path, and a linear array of photodiodes for detecting the dispersed light at different wavelengths. The system also includes an electronic control section including a programmable power supply for controlling the intensity of light from the light source whereby the combination of the use of the neutral density filters in conjunction with controlling the intensity of light from the light source can be used to operate the photodiode array to prevent operation thereof near the saturated and dark current levels, and means for scanning the photodiode array at high speeds during rotation of the chopper wheel to provide a high speed spectral readout.

8 Claims, 12 Drawing Figures

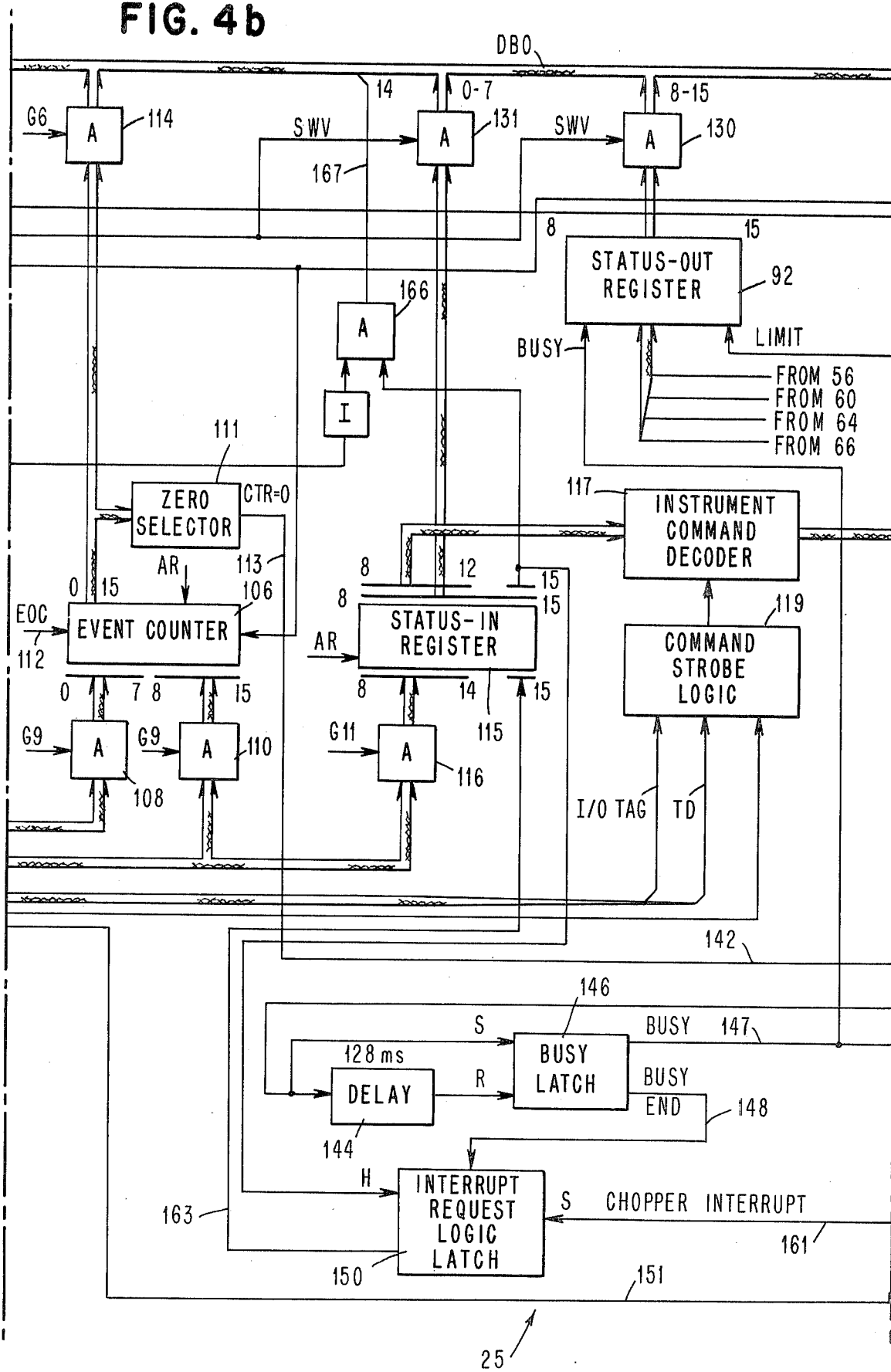

SPECTRUM ANALYZING SYSTEM WITH PHOTODIODE ARRAY

CROSS-REFERENCE TO RELATED APPLICATION

This application claims subject matter that is partially disclosed in application Ser. No. 587,459, filed June 16, 1975 for "Self-Calibratable Spectrum Analyzer" by R. N. Jackson et al, assigned to the assignee of the present application, and now U.S. Pat. No. 3,973,849. Such related application and patent is hereby incorporated herein by reference.

BACKGROUND OF THE INVENTION

1. Field of the Invention

This invention relates to a system for analyzing the colorimetric properties of a test sample and, more particularly, to improvements in systems of the type using a plurality of photodetectors providing signals at different wavelengths across a spectral band.

A need has developed within the prior art for automated spectrophotometric equipment designed to measure the colorimetric properties of a test sample at any predetermined wavelength or band of wavelengths. With the trend in the data processing industry towards smaller and smaller computers, this need for automated spectrophotometers has been met in part by integrating or incorporating a complete computer within the instrument system to provide completely self-contained automated systems. Such computers also act as controllers for not only operating the instrument and analyzing their results and providing some form of an output of the results, but also for controlling the operation of any sample handling equipment that might be used.

There has also been developed within the prior art improved means for detecting and analyzing a spectral band, such means being in a form of a self-scanning linear array of photodiodes. Such an array is advantageous because it can be operated at high speeds and thus can be readily operated taking advantage of the high speeds of modern computers. However, the arrays are also somewhat disadvantageous because of the fact that each of the photodiodes has to operate with sufficient light intensity to be above a dark current level but with an intensity below the saturation level of the photodiode in order to provide an accurate reading. Operation too near the dark current level or at saturation level will provide inaccurate or erroneous results.

SUMMARY OF THE INVENTION

One of the objects of the invention is to provide a spectrophotometric instrument system utilizing a linear array of photodiodes for detecting radiant energy over a wide band and providing output signals proportional to different wavelengths within the band, the instrument being operable at high speeds for measuring light at a wide range of differences in intensities.

Another object of the invention is to provide a spectrophotometric instrument using a linear array of photodiodes with means for regulating the intensity of light being detected so that the desired output of the array is above the dark current level and below the saturation level thereof.

Another object is to provide a spectrophotometer with a programmable power supply for regulating the intensity of a wideband light source, and a series of neutral density filters of different attenuating characteristics whereby the intensity of light being analyzed can be regulated through the use of either or both of regulation of the power supply and interposition of a neutral density filter of a predetermined attenuation characteristic.

A further object is to provide a spectrophotometer including a linear array photodiode detector in which light from a single source is directed along both a reference path and a sample path alternately with periods during which light is blocked from both paths so as to generate during the period of blocking a time during which the dark current levels of the photodiodes can be measured.

A further object is to provide a high-speed spectrophotometer utilizing a rotary chopper wheel having at least one opening or transparent window through which a beam of radiant energy can pass for a predetermined period during which time a linear array of photodiodes is first exposed and then scanned so as to produce a readout of the light intensity at different wavelengths.

Another object is to provide a method for the operation of a spectrophotometer in which the intensity of light being analyzed can be varied by regulation of a light source or use of a neutral density filter of predetermined attenuation characteristics and wherein the resultant colorimetric properties of a test sample are calculated by taking into account the particular level of the power supply or the particular attenuation characteristic of the neutral density filter being used.

In accordance with one feature of the invention, an analyzer system is provided in which light from a single wideband light source is directed along both a sample path and a reference path. A light chopper traverses both paths and includes a light conductive portion and an opaque portion that alternately allows light to travel along the respective sample and reference paths and to alternately block both paths. A dispersion grating is arranged to receive light from both paths and disperse it. A linear array of photodiodes is disposed to be irradiated by the dispersed light, the array being of a self-scanning solid state type whereby the photodiodes are first exposed during one period of time and the exposed photodiodes are scanned so as to produce output signals proportional to the intensity of light received at different wavelengths. Measurements are also made of the dark current level of the photodiodes and the colorimetric properties of the test sample is determined using the dark current levels along with the levels of the output signals induced by light traversing the sample path and the reference path.

In accordance with another feature of the invention, the saturation levels of the various photodiodes of the array are first determined. The spectrophotometer system also includes a programmable power supply for regulating the intensity of the light source and a series of neutral density filters that can be interposed in the light paths, the filters being of different attenuation characteristics. The neutral density filters can be used to provide a relatively coarse adjustment in the intensity of light traversing the same and reference paths and the intensity of the light source can be regulated to provide a finer control of the intensity, whereby the spectrophotometer can be operated to produce output data lying within a predetermined range above the dark current level and below the saturation level of the photodiodes.

Other objects and advantages of the invention will be apparent from the following description taken in connection with the accompanying drawings wherein:

FIG. 4 is a key to show how FIGS. 4a–4c are arranged to form a schematic wiring diagram of the spectrophotometer adapter and control shown in FIG. 1;

Figure 1:
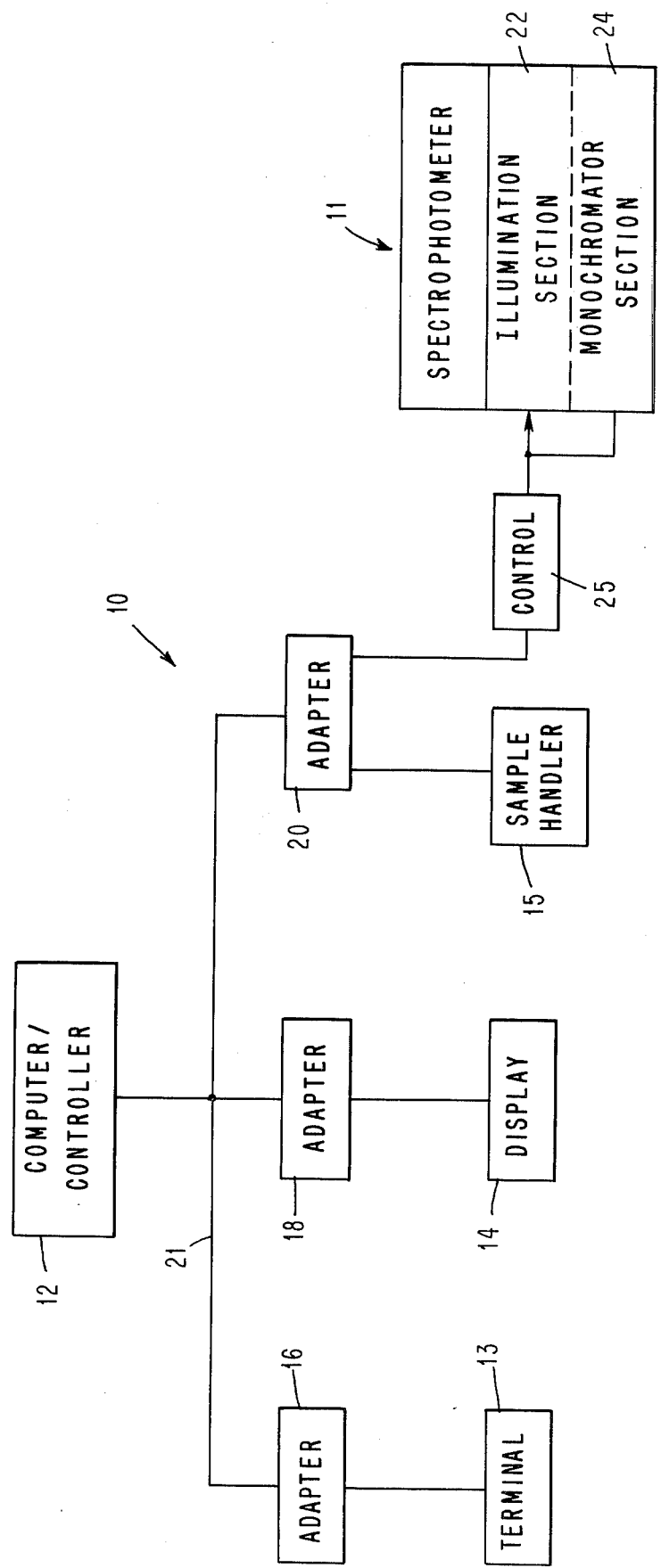
FIG. 1 is a schematic block diagram of a spectrum analyzing system embodying the invention.

Referring now to the drawings, there is shown in FIG. 1 a spectrum analyzing system 10 comprising a spectrophotometer 11, a computer or controller 12, an input/output terminal 13, a data display 14 and a sample handler 15. Adapters 16, 18 and 20 respectively connect terminal 13, display 14 and sample handler 15 and spectrophotometer 11 to the I/O bus or interface 21 associated with computer 12. Computer 12, terminal 13 and display 14 may be of any suitable conventional construction, the computer being operated under the control of programs and instructions stored in a storage system thereof. Adapters 16, 18 and 20 conform to the architecture of bus 21 to thereby adapt the devices connected thereto to operate as I/O devices under the control of the computer. System 10 can be interactive to enable an operator to enter commands through terminal 13 which are then interpreted by computer 12 to cause the functions defined by the commands to be performed. For measuring a test sample, it is expected that there be a "measure" command which would then cause the spectrophotometer to take data or measure the sample and the computer would then convert such data into meaningful information which could then be displayed on display 14 so the operator has an "immediate" response by the system to his commands.

The invention was designed in connection with a system 10 having an automatic sample handler 15, such as one of the type disclosed in U.S. Pat. No. 3,985,507—Litz et al, assigned to the assignee of the present invention. In such a system, many samples are loaded in trays and the system automatically steps through and performs different tests connected with analyzing the samples. However, it should be obvious that other forms of sample handlers could be used or that none may be used in which case the operator must manually present a test sample or place it next to the test probe. Further details of the sample handler are not germaine to the invention.

Figure 2:
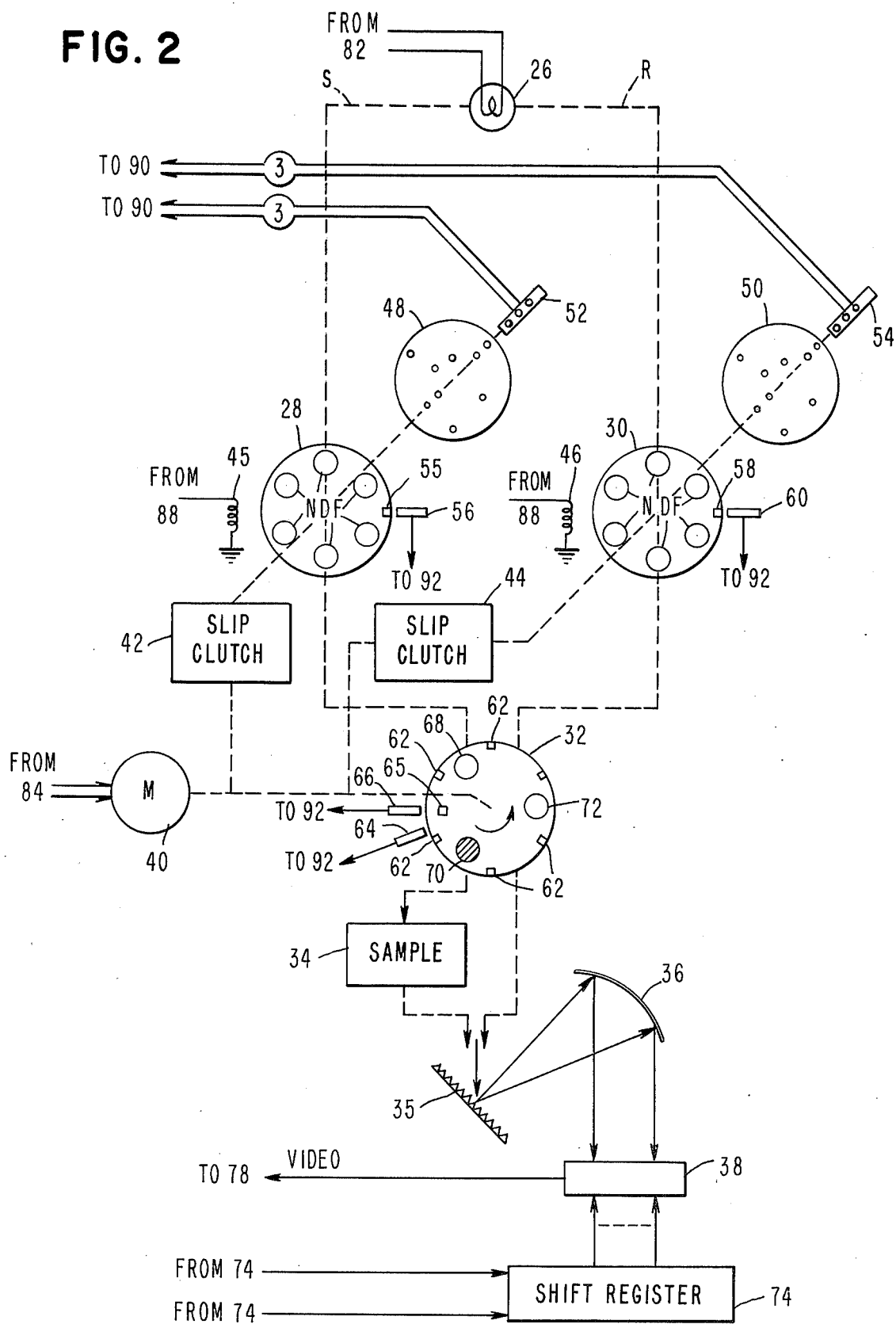
FIG. 2 is a schematic diagram of the spectrophotometer shown in FIG. 1.

Spectrophotometer 11 includes an illumination section 22 and a monochromator section 24, the details of which are shown schematically in FIG. 2 and are disclosed in the above-identified patent incorporated herein by reference, and to which reference may be had for further details thereof. Spectrophotometer 11 is connected to an electrical control section 25 that in turn is connected to adapter 20 for controlling the operation of sections 22 and 24 in the detailed manner described below.

Referring now to FIG. 2, spectrophotometer 11 comprises a conventional wideband light source 26 operable at different voltages to provide a light output at different intensities. Light from source 26 is directed along a sample path S and reference path R by an optical system disclosed in detail in the afore mentioned patent. Path S traverses a neutral density filter wheel 28 having six neutral density filters (NDF) of different attenuation characteristics including a clear one through which no attenuation occurs. Reference path R traverses a similar filter wheel 30 having six neutral density filters (NDF) arranged similar to those of wheel 28. Paths S and R converge on a chopper wheel 32 which alternately transmits light from each path through a transparent window 68 or opening and through a double peak calibration filter 72. Light passing through chopper 32 travels along path S through a sample 34 and is directed onto a reflection type dispersion grating 35 which disperses the light. A mirror 36 directs the dispersed light onto a linear photodiode array 38. Along reference path R, light passes from chopper wheel 32, is dispersed by grating 35 and directed onto array 38. In the schematic diagram of FIG. 2, it is assumed that spectrophotometer 10 is of a single range where the light band of interest is within the visible range. Consequently, grating 35 is stationary and a single peak filter has been eliminated so that its position 70 is now opaque, a movable grating and single peak filter being disclosed in said related application. Double peak filter 72 has two calibrating peaks within the visible range and further details thereof are unnecessary for an understanding of the invention.

A selectively energized motor 40 continuously rotates chopper wheel 32 when on. Slip clutches 42 and 44 are connected to the drive from motor 40 and are connected to wheels 28 and 30. Solenoid detent mechanisms 45 and 46 normally hold wheels 28 and 30 from rotating when the solenoids are de-energized. Upon a momentary energization of the solenoids, wheels 28 and 30 are moved through engagement of their respective slip clutches between adjacent positions whereby the detent mechanisms relatch. Connected to both wheels 28 and 30 are shaft encoders 48 and 50 that are opaque and have holes or windows therein arranged in a binary code to identify the respective NDF's. Photoelectric pick-ups 52 and 54 read the coded pattern on wheel 48 and 50 and respectively provide binary coded signals identifying which NDF is within each of the paths S and R. Magnets 55 and 58 are mounted in one position on a peripheral wheels 28 and 30 and actuate Hall cell pick-ups or detectors 56 and 60 respectively to provide signals indicating home positions of wheels 28 and 30.

Chopper wheel 32 has six magnets 62 located around the periphery which move adjacent to the position of a Hall cell pick-up or detector 64 to provide a series of timing signals as chopper wheel 32 rotates. A magnet 65 is also mounted on chopper wheel 32 to move adjacent to a Hall cell detector 66 to thereby provide a timing signal indicating the home position of chopper wheel 32.

Figure 3:
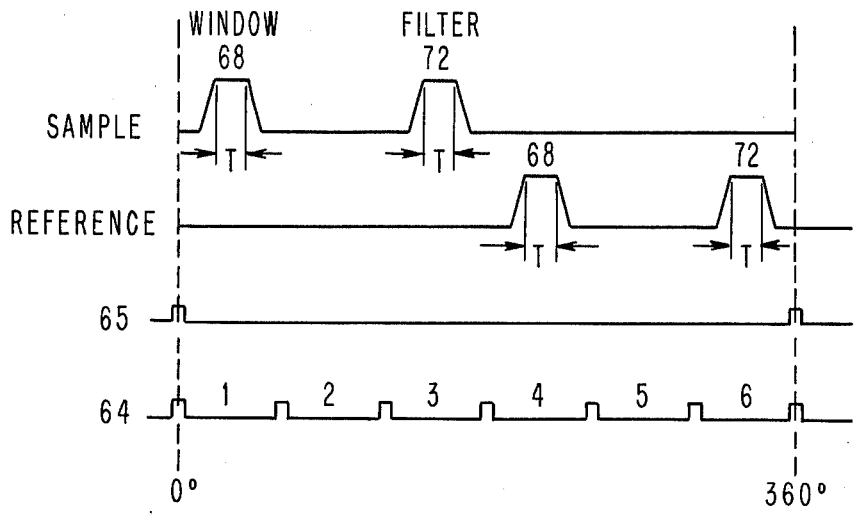
FIG. 3 is a timing diagram useful in understanding operation of the system shown in FIG. 1.

With reference to FIG. 3, as chopper wheel 32 rotates through one revolution, detector 65 provides a timing signal once for each revolution, and detector 64 provides six evenly spaced timing pulses dividing the cycle into six regions. Window 68 first traverses the sample path during the first period and this is followed during the third period by filter 72 traversing sample path. During the fourth and sixth periods respectively, window 68 and filter 72 traverse the reference path. Thus, during one revolution of chopper wheel 32, light is transmitted intermittently through window 68 and filter 72 alternately along the sample and reference paths. Window 68 and filter 72 remain directly in the sample and reference paths for predetermined periods T during which, as discussed in detail below, array 38 is exposed and then scanned to provide signals representing the intensity of light at different wavelengths received thereby. It should be obvious to those skilled in the art that the period P is proportional to the speed of rotation of wheel 32 and to the size of window 68 and filter 72. In one embodiment of the invention, wheel 32 is rotated at two revolutions per second and the window and filter are sized so as to produce a period T of approximately 39 milliseconds (ms).

Figures 4, 4C:
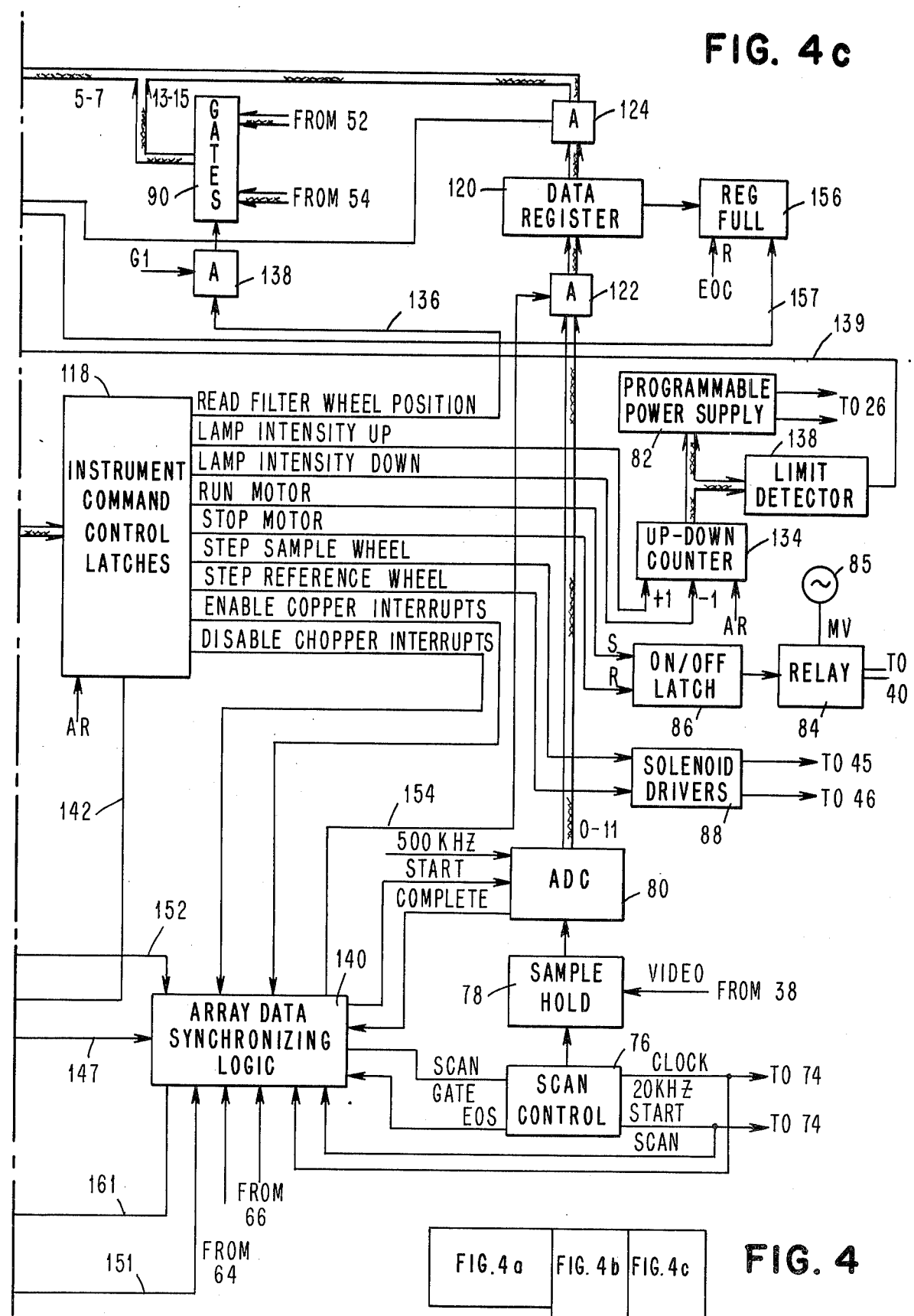
Figure 4A:
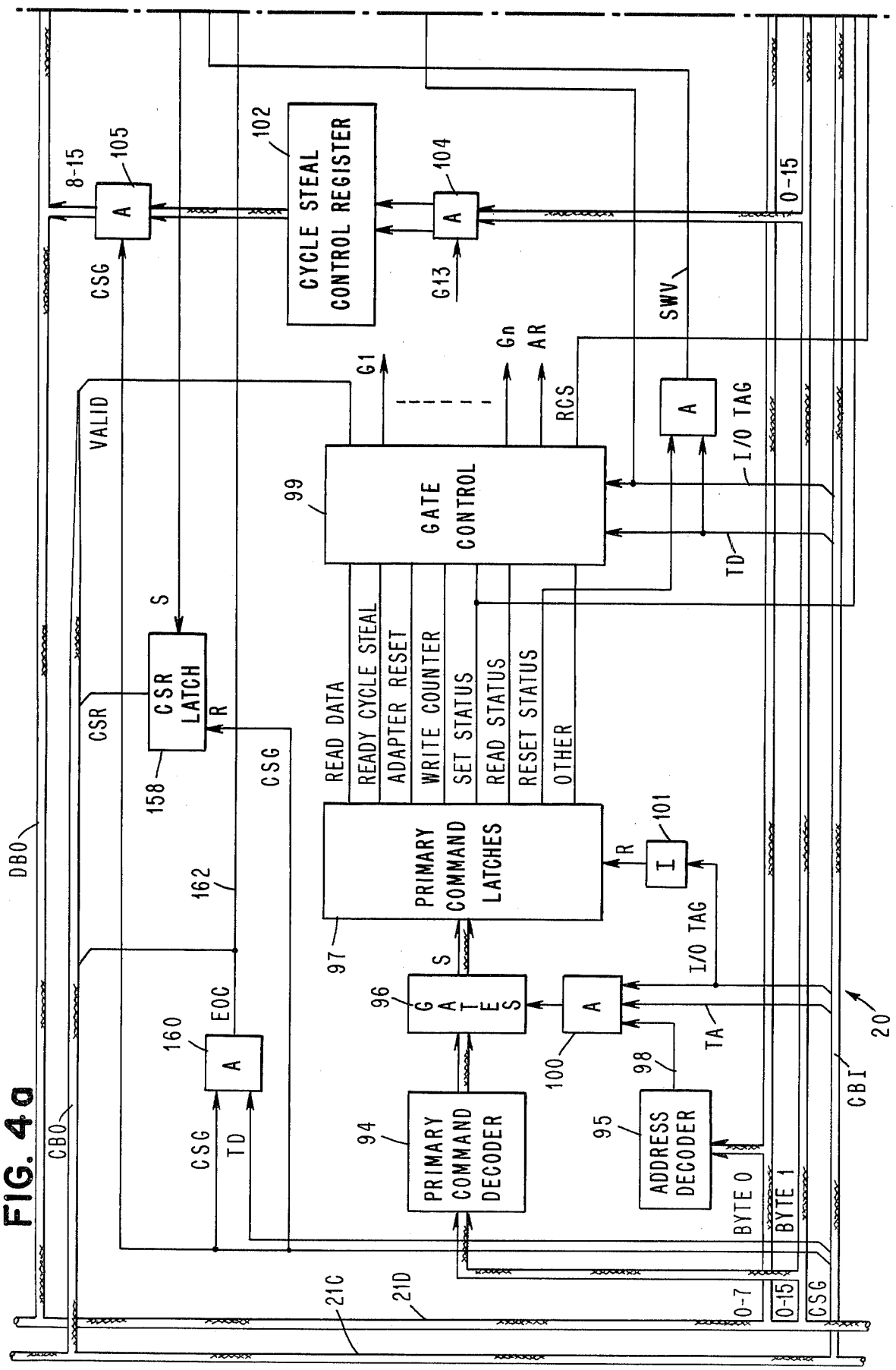

Array 38 is connected to a shift register 74, both elements being connected to a sample and hold and conditioning circuit 78 (FIG. 4) and a scan control 76 (FIG. 4). Elements 38, 74, 76 and 78 are conventional commercially available items, the array being, for example, a solid state line scanner RL-256E, available from Reticon Corp, Mountainview, California, and described in the literature entitled "Reticon Solid State Line Scanner RL-512, RL-256E", copyright 1972 by Reticon Corp. to which reference may be had for more detailed description and to the related literature. The exemplary array has 256 photodiodes arranged on two mil centers along a line. The diodes operate in a charge storage mode where the output of each diode below saturation is proportional to exposure, i.e., the light intensity times the time interval between successive scans. Each diode is in parallel with a capacitor whereby during the exposure portion of a cycle, the diode conducts to partially discharge the capacitor an amount proportional to the intensity of light. The array is then scanned by charging each capacitor back to full value and the amount of charge current is proportional to the light intensity. In the illustrated embodiment, the scan rate is done at a 20 kHz. so that the scan operation takes approximately 13 ms. Since light is transmitted for a period of 39 ms, it should be obvious that the array can be both exposed and scanned within the available time.

In operation, scan control 36 is provided with a scan gate signal which causes a start scan signal to be applied to shift register 74 along with the clock signal. The clocking causes an output signal to appear on the video line which is fed to the sample and hold circuit 78 when the last element of the array has been scanned, an end of signal (EOS) is transmitted from scan control 76. Circuit 78 may be similar to the Reticon cash 1B circuit which is operated by pulses at a rate synchronized with the scan rate to integrate each pulse on the video line and then sample and hold it while the integrator is set for the next pulse. Output circuit 78 is fed as an input to an analog-to-digital converter (ADC) 80 that is clocked at a 500 kHz rate to convert each pulse output from the array to a digital value corresponding to the intensity of light seen by each diode of the array. The converter is also of conventional construction commercially available. In order to separate in synchronism at the high rates of speed associated with the converter and scanning array, the circuits of the adapter and control may be implemented in a conventional technology and components.

The elements of spectrophotometer 11 described above are connected to adapter 20 and control 25 as indicated by the legends on the ends of the inter-connection lines in FIGS. 2 and 4. Lamp 26 is connected to a programmable power supply (PPS) 82 which is of a conventional commercially available type having a voltage output variable between sixteen different levels corresponding to the different values of a four-bit digitized input from an up/down counter 134. Variations in the input can cause the intensity of light 26 to be increased and decreased. Motor 40 is connected to a relay 84 which in turn is connected to a motor on/off latch 86 that is selectively operable to actuate and deactuate relay 84 so as to connect motor 40 to a power source 85 supplying operating power $V_M$ for running the motor. Solenoid detents 45 and 46 are connected to solenoid drivers 88 that are selectively operated to supply a pulsed voltage $V_S$ to momentarily unlock or disengage the detent and allow wheels 28 and 30 to move to the next position where the detents latch up. Pick-ups 52 and 54 are connected by three bit cables to respective input positions of gates 90 and provide signals indicative of the positions of wheels 28 and 30. Detectors 56, 60, 64 and 66 are connected to different positions of a status-out register SOR 92 so as to actuate different bit positions in the register to provide status signals associated with the detectors.

Bus 21 provides the interface between controller 12 and the adapters, the interface being such as to allow commands to go from the controller to the devices, and to allow data to flow both ways on the bus including the high speed transfer of data into the controller by cycle stealing operations and including the transfer information to the controller indicative of conditions in the instrument or other device being controlled. Referring now to FIG. 4, bus 21 includes control lines 21C and data lines 21D. These data lines are of a two byte data flow width with eight bits per byte so that the data bus is sixteen bits wide. Commands and data are transferred over bus 21D two bytes at a time, the individual bytes being identified as byte 0 and byte 1 which respectively occupy bit positions 0-7 and 8-15, these bit positions being shown throughout FIG. 4. Commands are sent from controller 12 over bus 21D and each command includes a device address in byte 0 and an op code or primary command in byte 1. Following each command, bus 21D is available for the transfer of data either to controller 12 or from controller 12. Bus 21C includes various lines for controlling the operation of bus 21 and the transfer of commands and data and interrupts. Control line 21C provides a timing address (TA) signal indicating that the signals on bus 21D represent a command, the signal TA being used to time gating of the primary command into the respective adapter addressed thereby. Bus 21C also provides an "I/O tag" signal indicating that bus 21 is available for I/O activity for transferring commands and data. When the I/O tag signal is not active or present, it indicates that bus 21D can be used to transmit interrupt requests over bit 14 line to signal the controller of any interrupt. Bus 21C also provides a timing data (TD) signal indicating that the data on bus 21D is usable by either the controller or one of the adapters. The signals TA, TD and I/O tag are rendered active and inactive by the controller. To transfer data to the controller, control bus 21C also includes a line that receives a "valid" data signal that is generated by the adapter and which signifies to the controller that the data on bus 21D can be accepted by the controller. Bus 21C also includes a line for transmitting a cycle steal request (CSR) signal from an adapter to the controller, a cycle steal grant (CSG) signal from the controller to the adapter and an end of chain (EOC) signal from the adapter to the controller, which signals are used for controlling cycle steal operations.

Adapter 20 includes a control bus IN (CBI) connected to bus 21C for receiving the signals generated by the controller, and a data bus IN (DBI) connected to data bus 21D for receiving data signals thereon. Adapter 20 further includes a data bus OUT (DBO) and control bus OUT (CBO) for respectively transmitting data signals and control signals from adapter 20 to controller 12. In FIG. 4, the respective control lines are identified by the various respective control signals carried thereby.

In the course of operation, commands are sent out over bus 21D during one period of operation and these commands are followed in a succeeding period by a data transfer. The commands and data are on the bus and are available to all units connected thereto so that only the specific unit identified by the unique address can use the data. Adapter 20 has an address that identifies it or distinguishes it relative to the other adapters in the system.

When a command is received by adapter 20, the address in byte 0 is placed in an address decoder 95 which is operative to generate an active signal on line 98 when the address on byte 0 corresponds with that of adapter 20. A primary command decoder 94 is connected to bus DBI to receive the signals representing byte 1, the output of the decoder being passed through gates 96 so as to set one of a plurality of primary command latches 97 associated with the particular command decoded by 94. The latches 97 includes one latch for each of the different primary commands and wherein the primary commands are inscribed above the output lines of latches 97 in FIG. 4. It will be appreciated that there may be more or less commands and that because of the general nature of the controller and the fact that the primary commands would be common or sent to all of the adapters, some of the individual commands may or may not be used by an individual adapter and device connected thereto. The output lines of the latches 97 are connected as inputs to a gate control circuit 99 that generates a plurality of gating signals G1-Gn and other output signals described hereafter, for controlling the flow of information through adapter 20 and control 25. When a command is issued by the controller, which includes the primary command and address, it is followed in the next cycle of operation by a data word containing 16 bits in both bytes 0 and 1 which data information is thereafter routed in accordance with the particular command and as controlled by the various gating signals.

An AND circuit 100 receives as inputs line 98, TA line and I/O tag line and upon the concurrence of active signals on these lines, produces an output signal that actuates gates 96 to pass the decoded primary commands from 94 to 97 to thereby set one of the latches. The I/O tag signal is active throughout two cycles during which the command in the first cycle and data in the second are transmitted. The I/O TAG signal is inputted to inverter 101 connected to the reset input of latches 97 whereby, at the end of the second period, the I/O tag signal becomes inactive and the respective one of latches 97 previously set by a command, is reset. The TD signal is active at a fixed interval after the TA signal has been rendered inactive and it is used in conjunction with an active I/O tag signal as inputs to gate control 99 to thereby generate the various gating signals.

A cycle steal control register 102 is connected through an AND gate 104 to receive byte 1 from bus DBI, the register being set, in response to gating signal G13, with the address or identification of a register within controller 12 containing the address where the data about to be transferred to the controller through cycle steal operations is to be stored. In the operation of the cycle steal, the primary "ready cycle steal" command and adapter 20 address are decoded and byte 1 of the subsequent data cycle is placed in register 102.

Register 102 is further connected through an AND gate 105 to bus DBO and upon being gated onto such bus by the active CSG signal, causes the information in 102 to be transferred back to the controller, in the manner more fully described below.

Adapter 20 further includes a step-down event counter 106 that is two bytes wide. The inputs of counter 106 are connected through AND gates 108 and 110 to bus DBI. When adapter 20 receives a "write counter" command, gates 108 and 110 are gated by signal G9 to place the contents of DBI within the register, the signals on DBI representing initially the number of data transfers that are to take place during a cycle steal operation. The counter 106 would be initially set to 256, i.e., the number corresponding to the number of elements in array 38. A control input line 112 is connected to receive an EOC signal so that each time a data transfer takes place, counter 106 is stepped-down or decremented by 1. The output of counter 106 is connected to a zero detector 111. When detector 111 detects that counter 106 is set to 0, detector 111 provides an output signal CTR=0 on output line 113 to thereby indicate such condition. The output of counter 106 is also connected through AND gate 114 to bus DBO so that its contents can be read back to the controller by a read counter command (not shown).

An eight bit wide status-in register 115 is connected through gate 116 to receive bits 8–14 of bit 1 in response to a primary "set status" command whereby bit positions 8–14 of register 114 are set in accordance with the pattern of 1 bits in the byte. Register 115 includes five bit positions 8–12 representing secondary commands that are used to direct the instrument to perform various functions. It will be appreciated that while the five bit positions allow the use of 32 different commands, some of these commands can be used for operation of sample handler 15 and are not germane to an understanding of the invention. The "secondary" commands are also called "instrument" commands and a decoder 117 is connected to register 115 to decode bit positions 8–12 and set one of a plurality of instrument command control latches 118 which one corresponds to the specific command, the various secondary commands being illustrated by the legends appears on the output lines of latches 118. Bits 13–15 in register 115 are used for different purposes. Bit position 13 is used for machine check operations and is set when an error occurs in the instrument. Bit 14 is an enable bit which is turned on and off by set and reset status commands by means of a one bit in the data field corresponding to bit 14. When the enable bit is off, the adapter is disabled from requesting interrupts. Bit 15 is turned on by the interrupt request signal from the instrument control section 25. It is turned off by a reset status command having a 1 bit in the bit 15 position in the data field.

Decoder 117 is operative upon receiving an active signal from a command strobe logic circuit 119 used to indicate when a command that has been placed in register 115 is valid and can be decoded for initiating the instrument operation defined thereby. Circuit 119 may be an AND circuit that requires the coincidence of active I/O TAG, TD and set status signals to generate its active output. Each of latches 118 provides an output signal for a time sufficient to cause the operation controlled thereby to occur. Latches 118 may be reset by the AR signal. It should be appreciated that while other commands could be used to control other functions of the instrument (not described), only those commands that are necessary for an understanding of the invention are illustrated.

Adapter 20 also includes a data register 120 that is twelve bits wide and receives data from ADC 80 through a gate 122. Register 120 is further connected through gate 124 to place its contents on bit lines 0-11 of data bus 21D when the data in register 120 is being transferred by cycle steal operations to controller 12.

Certain of the instrument commands cause functions to be performed that require a short period of time before the results have stabilized, such functions being, e.g., changing the lamp intensity, starting the motor or stepping the NDF wheels. To allow for the stable positions, latches 118 provide provide an output on line 142 in conjunction with such commands where the output is fed to the set side of a busy latch 146. A delay circuit 144 is connected to the reset side of latch 146. Upon receipt of an active signal on line 142, latch 146 is set and time delay is initiated so that the end of this period, an active signal appears on the reset input of latch 146. A delay of 128 ms is exemplary. Latch 146 provides two outputs on lines 147 and 148, the active output on line 147 indicating the busy condition of the instrument which signal is fed as an input to logic 140 and to a busy bit of status out register 92. The busy bit in such register is used by the controller to prevent further commands or operations from being initiated during the busy period. The active signal on line 148 is a "busy end" signal that is used by interrupt request logic 150 to transmit any pending chopper interrupt signals.

The operations of the system thus far described will now be explained in connection with what happens in response to the various primary commands and instrument commands. The various primary commands function as follows:

READ DATA—This command is used to transfer data representing the positions of NDF wheels 28 and 30. Position signals are generated and stored in cells 52 and 54. In order to use this command, it is first necessary to issue the instrument command of "READ FILTER WHEEL POSITION" which places an active signal as an input to AND gate 138. In response to the READ DATA command, a gating signal G1 is generated which is also applied as an active input to gate 138 to thereby activate gates 90 and place data or signals representing the wheel position on DBO.

WRITE COUNTER—This command is used to set event counter 106 to a predetermined number. It is specifically used to indicate the number of data transfers that will take place during a reading of array 38 by cycle stealing and is initially set through issuance of the command to indicate 256 data transfers corresponding to the number of diodes in the array. In response to this command, a gating signal G9 is generated by controller 99 which writes bytes 0 and 1 into counter 106 through gates 108 and 110. These bytes contain information representing the predetermined number to which the counter is being set.

SET STATUS—This command is used to place an instrument command in register 115 and to set the enable bit 14 thereof. In response to this command, a gating signal G11 is generated by 99 which causes byte 1 on DBI to be placed in status register 115 or byte 1 contains 1 bits in those positions to which the corresponding positions of register 115 will be set.

READ STATUS—This command is used to read the contents of status registers 115 and 92 to the controller, the principal being to allow the controller to check the status of the instrument conditions controlling the setting of register 92. The read status active signal from latches 97 is fed as an input to AND circuit 152 which also receives a TD signal input, the conjunction of the two active signals providing a SWV (status word valid) output signal that is applied as an input to gates 131 and 130 for respectively gating the contents of registers 115 and 92 onto bytes 0 and 1 of DBO for transfer to the controller.

RESET STATUS—This command is used to reset register 115 to remove any secondary commands therein, to turn off enable bit 14 and to reset bit 15 after an interrupt has been processed. In response to this command, a gating signal G11 gates the contents of byte 1 of DBI into register 115 where the respective bit positions thereof are reset in accordance with 1 bits in byte 1.

ADAPTER RESET—This command is used to reset the various latches within adapter 20 and controller 25 and to reset counter 34 to the minimum level so that the pump is set to minimum intensity. In response to this command, an adapter reset signal AR is generated that is applied as inputs to the reset inputs of the various latches and counter.

READY CYCLE STEAL—This command is used to read array 38. Execution of this command requires that event counter 106 be in a non-zero condition so that it is first necessary to set counter 106 to the desired value of 256 corresponding to the number of data transfers that are to take place during the cycle steal operation. In response to the ready cycle steal command, a ready cycle steal (RCS) signal is applied to logic 140 over line 151. Logic 140 then checks for the concurrence of no active CTR=0 signal on line 152, which occurs when event counter 106 is set to some number other than zero, and then initiates the scan by issue a scan gate signal to control 76. In order to operate array 38, it is necessary to have a first scan to charge all the capacitors therein, then the diodes are exposed to the light so as to discharge the capacitors by amounts proportional to the intensity of the light received thereby, and then the array is placed through another charging cycle or scan at which point the charge current determines the intensity of the light level for each element of the array. To accomplish this, controller 76 provides a start scan signal to shift register 74 and a clock pulse and during the scan or readout of the arrays, the array 38 produces a video pulse sequence on or from the array which is passed to sample hold circuit 78. The output of this circuit is connected to ADC 80 which is operative to convert each video signal received thereby to a 12 bit digitized representation thereof that is proportional to the intensity of light received by the individual diode.

To accomplish this conversion, logic 140 sends a start signal to ADC 80 which converts the video signal one bit at a time at a rate of 500 kHz. When the signal has been converted into twelve bits, ADC 80 sends a "complete" signal to logic 140 which thereupon renders line 154 active to actuate gate 22 and thereby place the converted or digitized data in register 120. When the register is full, a reg full latch 156 is set and this generates an output on line 157 that sets a cycle steal request (CSR) latch 158. The output of latch 158 is connected to CBO and sends an active CSR signal to the controller. In response to such signal, controller 12 responds with a cycle steal grant (CSG) signal which as previously indicated, activates gate 105 to transfer the contents of register 102 back to the controller to indicate where the data should be stored. The CSG signal also is applied to the reset of latch 158 causing it to be reset and thereby turn off the CSR signal. The CSG signal is also applied to AND circuit 160 and when the TD signal becomes active to indicate that data may be transferred, an end of chain (EOC) signal is placed on line 162, such signal being fed back to the controller through CBO, applied to AND gate 124 to place the contents of data registers 120 on DBO, and to event counter 160 to step down or decrement the counter by one. This chain of signals occurs for each video signal received from a diode whereby data is transferred over bus 21D at approximately a five microsecond rate coincident or equal to the clock rate at which the array 38 is scanned. When all 256 data elements have been transferred, CTR=0 signal on line 113 becomes active thereby causing logic 140 to terminate the process and complete execution of the "READY CYCLE STEAL" command.

The instrument commands function as follows:

READ FILTER POSITION—This command provides an active signal on line 136 to partially enable AND gate 138. Gate 138 is actuated in the manner described above for the READ DATA command.

LAMP INTENSITY UP & LAMP INTENSITY DOWN—Counter 134 is a four bit wraparound counter whereby, when it is at its maximum setting of all one bits, a further increment will cause it to be set to all zero bits corresponding to the lowest level, and when set at the lowest level, a decrement will cause the counter to be set at its highest level. A limit detector 138 is connected to the output of the counter and detects the all 1's and all 0 positions corresponding to the high and low limits, the detector being operative to provide a signal on line 139 that activates one of the bits in status register 92 indicating that the lamp level intensity is at one of the limits.

RUN MOTOR 40 & STOP MOTOR 40—These commands provide on/off control for operation of motor 40 through the on/off control latch 86.

STEP WHEEL 28 & STEP WHEEL 30—These commands are used to actuate solenoid drivers 88 thereby allowing wheels 28 and 30 to be stepped between adjacent filter positions.

ENABLE CHOPPER INTERRUPTS & DISABLE CHOPPER INTERRUPTS—These commands are provided for use by the controller to utilize the timing signals from detectors 64 and 66 to generate interrupts. It provides a means by which the controller can count the number of timing signals. These commands are used to generate interrupts by actuation of detectors 64 and 66 whereby controller 12 can determine the position of the chopper wheel and when to issue the READY CYCLE STEAL command to read array 34. An interrupt signal generated by detectors 64 or 66 passes through logic 140 and generates a chopper interrupt signal on line 161. Such signal sets interrupt request logic 150 causing it to generate a signal on line 163 for setting bit 15 of status register 115. Bit 15 of register 115 is also connected to a line 165 which provides a first signal to latch 150 causing it to be held on until the interrupt has been honored, and a second signal fed to an AND circuit 166 which is operative, when the I/O tag signal is inactive, to generate an output on line 67 that is fed to bit 14 of DBO. In the manner of the architecture, this signifies that an interrupt request has been made. The controller would then respond with a "reset status" command to turn bit 15 off to thereby interrupt the hold circuit to latch 150 causing it to be reset.

Figure 5:
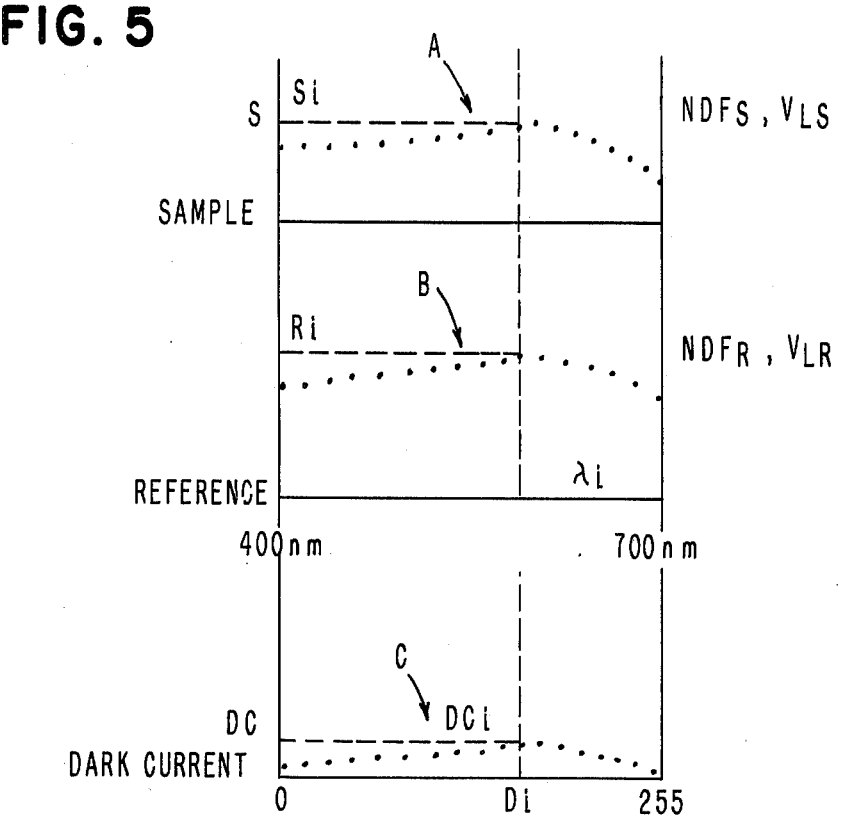
FIG. 5 is an exemplary graph useful in explaining and understanding how a sample colorimetric measurement is made.

As has been previously explained, during the course of rotation of chopper wheel 32, six timing signals are generated by detector 64 dividing the period of rotation into six sub-periods. During periods 1 and 4, the relative intensities of the sample and along the reference path are measured and during period 2 or 5, a reading is taken of the dark current of each of the diodes. FIG. 5 represents exemplary readings taken during the course of one revolution, there being a lesser number of data points plotted in FIG. 5 than actually exist, for simplicity of illustration. It will be appreciated that in connection with each of the 256 data points, that calculations can be made at each point to provide a colorimetric analysis across the visible range. The instrument system particularly lends itself to providing an analysis at only one data point such as might be connected with making an absorbance reading at a preselected wavelength in order to obtain information about the characteristics of the material. To determine the absorbance at a given wavelength, the array is scanned during the sample, reference and dark current periods to obtain 256 data points for each period, and then using the data points at the preselected wavelength, the absorbance is determined in accordance with equations (1) and (2).

$$T = \frac{S_i - DC_i}{R_i - DC_i} \times \frac{TE_R}{TE_S} \times \frac{C_1 V_{LR}}{C_2 V_{LS}} \quad (1)$$

$$A = -\log T = \log \frac{1}{T} \quad (2)$$

Wherein:

T is the transmittance.

$S_i$ is the relative output of diode i corresponding to the desired wavelength during the sample period;

$R_i$ is the relative output of diode $D_i$ during reference period;

$DC_i$ is the output of diode $D_i$ during the dark current period;

$TE_R$ is the transmission efficiency of the neutral density filter in the reference path when $R_i$ is measured;

$TE_S$ is the transmission efficiency of the neutral density filter in the sample path when $S_i$ is measured;

$V_{LR}$ is the voltage level of the light along the reference path when $R_i$ is measured;

$V_{LS}$ is the voltage level of the light along sample path when $S_i$ is measured;

$C_1$ and $C_2$ are constants that are predetermined or measured emperically and equate the lamp voltage level to the intensity along each of the reference and sample paths; and A is the absorbance;

On many occasions, the values of $S_i$ and $R_i$ will be measured during the same rotation of wheel 32. However, there will also be times when either value, when initially measured, is too close to either the saturation or dark current level of the associated diode and a corrective measurement is made using either a different voltage for the light source, or a different NDF, as more fully explained relative to FIG. 8.

Figure 7:
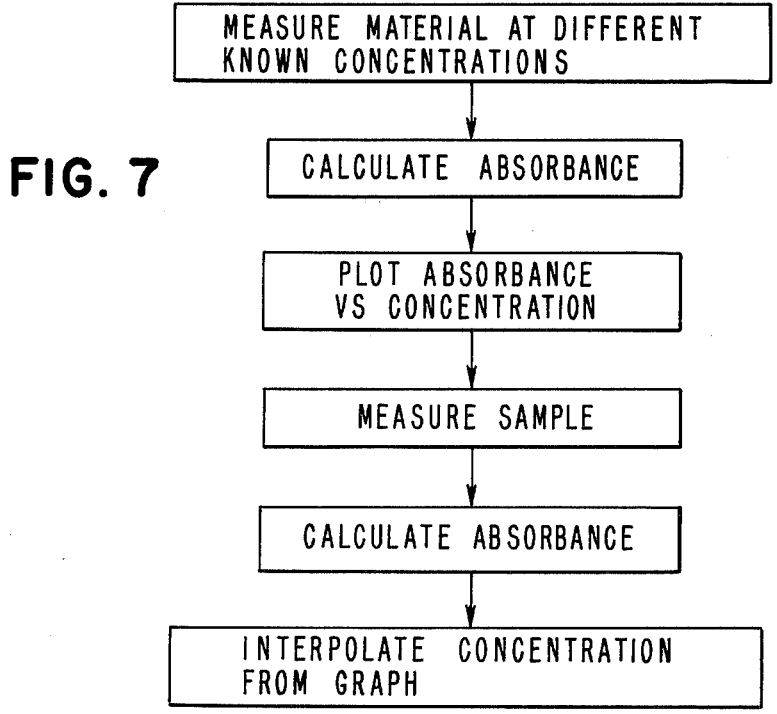
FIG. 7 is a flow chart of a method for operating the system shown in FIG. 1 to measure the concentration of a test sample.
Figure 6:
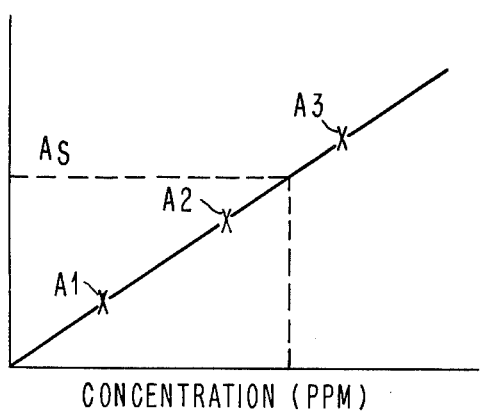
FIG. 6 is an exemplary graph useful in explaining how a colorimetric measurement is used to determine the concentration of a test sample.

Because of the ability to measure absorbance, the instrument is particularly adaptable to measuring the concentrations of unknown quantities in accordance with a method best understood with references to FIGS. 6 and 7. In accordance with this method, the absorbance at a given wavelength $\lambda_i$ is measured by making for example three absorbance measurements $A_1-A_3$ at different known concentrations and then plotting these in a manner similar to FIG. 6. In many cases, in accordance with the well known Beers Law, such a plot is linear. Thereafter, the absorbance $A_S$ is measured of the sample of unknown concentration and by a simple interpolation, the concentration $C_S$ is determined. It should be appreciated that this method is preferably carried out through use of a conventional type of program stored within controller 12 in which case a plot or graph may not necessarily be made since it be only necessary to use standard linear interpolation calculations of the known data points to obtain the concentration of the sample.

Figure 9:
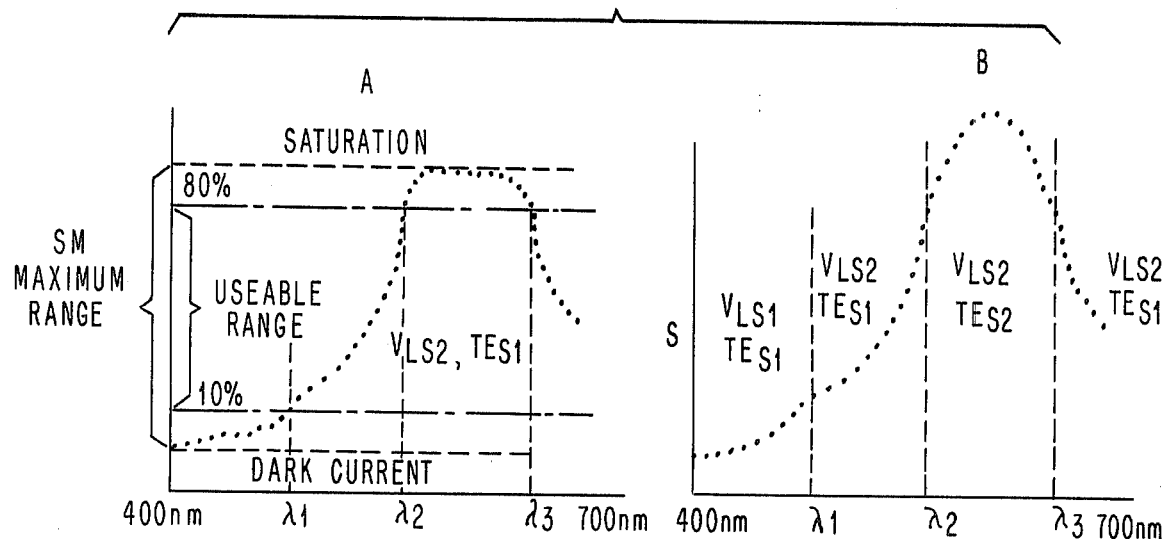
FIG. 9 shows two graphs useful in understanding the invention.

With reference to FIG. 9, graph A illustrates the measured intensity $S_M$ of a sample versus wavelength across the visible spectrum range. Each diode has two levels that are of concern, the dark current level and the saturation level and the spread between these two levels provides the range of operation of the individual diode. Each diode would have a slightly different dark current value and saturation level which would be determined ahead of time but for simplicity of illustration, these values have been shown as being equal across the range. As the measured intensity $S_M$ approaches the dark current level, the signal-to-noise ratio becomes less and less and therefore there tends to be introduced a higher degree of error. If the light level is sufficiently intense as to saturate the diode, then the maximum measured intensity $S_M$ would be at the saturation level and no relative intensity can be measured. To allow measurements to be accurate then, the range of measured values between dark current and saturation is predetermined ahead of time and this range is sub-divided into a usable range wherein only those values that are within 20% and 10% of the saturation level and dark current level respectively will be used. Thus, to obtain accurate relative intensities, it might be necessary to take corrective measurements at different settings of light intensity and with use of different density filters to bring the measured values within the usable range and to allow, as is done in equation (1), for the different levels of the light source and NDF's.

Figure 8:
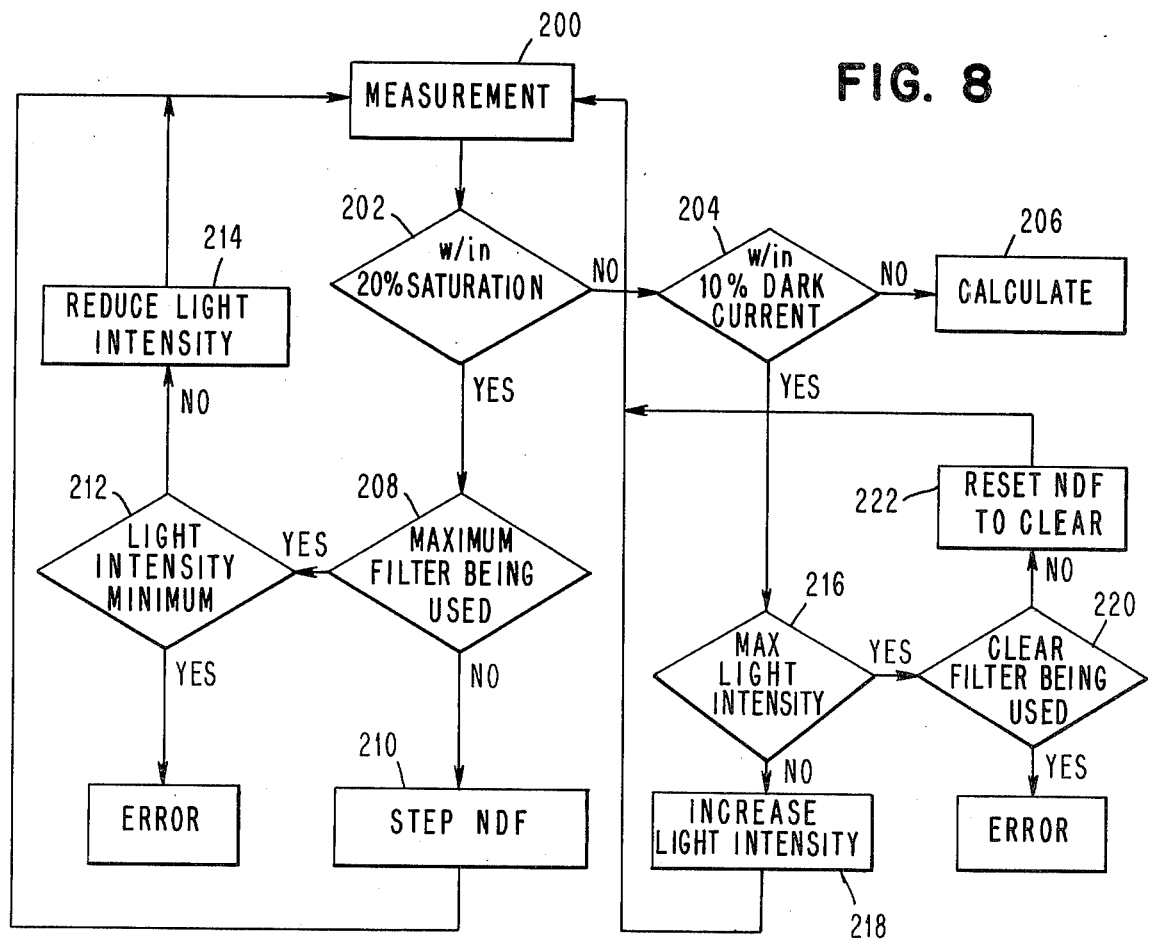
FIG. 8 is a flow chart of a method for operating the system shown in FIG. 1 by controlling the light intensity so as to produce readings within a range between the dark current level and the saturation level of the photodiode array.

While FIG. 8 shows "sample" measurements, a similar situation exists relative to making "reference" measurements. The determination of the measured values relative to the usable range is done for both sample and reference measurements at any given wavelength of interest. Where there is only one wavelength of interest, such as used in connection with measuring the absorbance as previously explained, these values or measurements are determined only relative to this one wavelength.

It should be obvious that there are several ways in which both the light source and the NDF's can be controlled to regulate the light intensity along both paths, and the process illustrated in FIG. 8 is exemplary of only one advantageous method or process. As the first step of the process, a measurement is made by step 200 to obtain a first value. In step 202, the determination is made as to whether this value is within 20% of the maximum range below saturation. If the measurement is not within the 20% of saturation, then step 204 determines whether or not it is within 10% of the range above the dark current. If it is not, then step 206 proceeds with calculating the desired value. If as a result of step 202 the answer is yes, then step 208 determines whether the NDF being used has the maximum attenuation characteristics. If it has not, then step 210 moves the NDF wheel through one step to bring an NDF of greater attenuation into use. The measurement is repeated in step 200 and the process would continue. If in step 208 the maximum attenuation filter is being used, then no further reduction in the light intensity can be made through stepping the filter wheels and any light reduction has to be made through reducing the intensity of the voltage of the light source. Thus, if the answer to step 208 is yes, then step 212 determines whether the intensity of the light source is at the minimum value. If it is, then the measurement cannot be reduced below the 10% of the saturation line and an error signal may be generated. If the light is not at the minimum level, then step 214 would reduce the light by either a single increment or predetermined increment, a measurement 200 would be repeated, and then the process would repeat itself.

If the determination from step 204 is that the measurement is within 10% of the dark current value, then an attempt is made to correct this initially by increasing the light intensity and then, if that is not sufficient, using an NDF of higher transmission efficiency. If neither can be done, then an error is generated. Step 216 determines whether the intensity of light from a light source is at its maximum value. If it is not, then step 218 would increase the voltage to the light source after which another measurement 200 would be made and the process repeated. If step 216 results in a positive determination, then step 220 decides whether the clear filter or filter of highest transmission efficiency is being used. If it is, then no further increase can be made in the light intensity and an error is indicated. If it is not, then step 222 resets the neutral density filter wheel to the clear or maximum transmission efficiency filter after which a measurement 200 is made to go through the process.

Corrective measurements may also be made across the spectral band, at each wavelength, to produce an accurate plot. Using the example shown in FIG. 9, assume that the measurements in graph A were made. The values between wavelengths $\lambda_1$ and $\lambda_2$ and $\lambda_3$ and 700 nm are within the usable range. The values from 400 nm to $\lambda_1$ are below the usable range and the values between $\lambda_2$ and $\lambda_3$ are above the usable range. Further assume that all such values were made using a NDF having efficiency $TE_{S1}$ at a voltage level $V_{LS2}$, and where the NDF is not the one having the losest efficiency, and $V_{LS2}$ is not at maximum level. Then, further measurements can be made for the band 400 nm—$\lambda_1$ at an increased intensity due to a higher $V_{LS1}$. In other words, such measurements can be made at an increased gain. Measurements are also made for the band $\lambda_2$—$\lambda_3$ using an NDF of greater attenuation $TE_{S2}$. Then, by using such gain and attenuation factors, a single curve B can be made showing the relative measurements across the complete spectral band.

It should be obvious to those skilled in the art that many changes can be made in the details and arrangements of the parts and steps of operation without departing from the spirit and scope of the invention as defined in the appended claims.

What is claimed is:

1. In a spectrophotometer having a source of polychromatic light, light detector means, and optical means defining sample and reference paths for transmitting light from said source to said detector means said sample path being adapted to receive a sample whereby light traversing such path indicates such sample and thereafter is transmitted along the remainder of said sample path, said reference path conducting light from said source for analytical comparison of such light with light from the sample, said optical means including means for dispersing light being transmitted along said paths whereby said detector provides output signals representing spectral energy distribution of light received thereby, the combination comprising:

a continuously rotating member disposed across said paths and operative to control the transmission of light therealong from said source to said detector means, said member repetitively defining during each complete rotation thereof a first period during which light is transmitted along the entire length of said sample path, a second period during which light is transmitted along the entire length of said reference path, and a third period during which light is blocked from transmission along the entire lengths of both of said paths;

timing means responsive to movement of said member and operative to provide repetitive timing signals corresponding to said first, second and third periods;

said dispersing means being fixed and operative to direct light dispersed thereby onto said detector means;

said detector means comprising a self scanning photodiode array having a plurality of photodiodes disposed in a linear array in the path of light dispersed by said dispersing means, said array being operated in response to said timing signals to provide during the course of rotation of said member first and second series of discrete analog signals respectively during said first and second periods representing the spectral energy distribution of light incident thereon from respectively said sample and said reference paths and a third series of signals during said third period representing dark current values of each of said photodiodes, each of said photodiodes being associated with light energy of a different and predetermined wavelength; analog-to-digital conversion means connected to receive said signals from said detector means and provide digital signals corresponding thereto, said conversion means being operated in synchronism with operation of said array to provide said digital signals during said first, second and third periods;

and digital calculating means operative to receive said digital signals and calculate colorimetric properties of a sample.

2. The combination of claim 1 comprising:
a selectively operated power supply for controlling the intensity of light from said source of light;
a series of neutral density filters each of different attenuation characteristics disposed in said sample and reference paths;
selectively operable means for positioning said filters in said paths one filter at a time in each path so as to attenuate light passing through such filter in accordance with the attenuation factor thereof;
said output signals from said photodiode array varying between extreme limits of a dark current level and a saturation level and including a useful range between said extreme limits;
and control means responsive to an output signal from said detection means to selectively operate said power supply and said positioning means when such output signal falls outside of said useful range to vary the intensity of light producing such output signal so as to thereafter cause said output signal to be within said range.

3. The combination of claim 1 wherein, for a diode associated with a predetermined wavelength, the digital signals generated by light traversing said reference and sample paths have values R and S, and the digital signal representing the dark current value of such photodiode is D and said calculating means calculates the colorimetric property of a sample at such predetermined wavelength using the ratio of (S-D)/(R-D).

4. The combination of claim 3 comprising a plurality of attenuators selectively positioned in said sample and reference paths and having different transmission efficiencies, and said calculating means calculates colorimetric property using the factors $$\left(\frac{S-D}{R-D}\right) \times \frac{TE_R}{TE_S}$$

where $TE_R$ and $TE_S$ are the transmission efficiencies of said attenuators positioned respectively in said reference path and said sample path.

5. The combination of claim 3 comprising a selectively operated power supply connected to said source of light and operative to supply power thereto at different levels of excitation for controlling the intensity thereof,
said value S being measured when said power is at one excitation level,
said value R being measured when said power is at another excitation level;
and said calculating means calculates said colorimetric property using the factors $$\left(\frac{S-D}{R-D}\right) \times \frac{\text{said one excitation level}}{\text{said another excitation level}}$$

6. The combination of claim 3 comprising:
a plurality of neutral density filters selectively positioned in said sample and reference paths and having different transmission efficiencies;
a selectively operated power supply connected to said source of light and operative to supply a variable voltage $V_L$ thereto for controlling the intensity thereof;
and said calculating means calculates said colorimetric property using the factors $$\frac{(S-D)}{(R-D)} \times \frac{V_{LR}}{V_{LS}} \times \frac{TE_R}{TE_S}$$

where $V_{LR}$ and $V_{LS}$ are the respective voltages used when R and S are measured, and $TE_R$ and $TE_S$ are the respective transmission efficiencies of said filters used when R and S are measured.

7. The combination of claim 2, wherein said control means is operative to decrease said output level by selectively decreasing the intensity of said light source or by positioning a filter of higher attenuation characteristics in said path of light.

8. The combination of claim 2 wherein said control means is operative to increase said output level by selectively increasing the intensity of said light source or by positioning a filter of lower attenuation characteristics in said path of light.

* * * * *